United States Patent
Takaoka et al.

(10) Patent No.: US 10,516,162 B2
(45) Date of Patent: Dec. 24, 2019

(54) NON-AQUEOUS ELECTROLYTE SECONDARY BATTERY, AND BATTERY PACK OBTAINED BY CONNECTING PLURALITY OF NON-AQUEOUS ELECTROLYTE SECONDARY BATTERIES

(71) Applicant: KANEKA CORPORATION, Osaka-shi, Osaka (JP)

(72) Inventors: Ayumi Takaoka, Osaka (JP); Yukimasa Niwa, Osaka (JP)

(73) Assignee: KANEKA CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 15/320,678

(22) PCT Filed: Jun. 23, 2015

(86) PCT No.: PCT/JP2015/068102
§ 371 (c)(1),
(2) Date: Dec. 20, 2016

(87) PCT Pub. No.: WO2015/199101
PCT Pub. Date: Dec. 30, 2015

(65) Prior Publication Data
US 2017/0155138 A1    Jun. 1, 2017

(30) Foreign Application Priority Data

Jun. 24, 2014  (JP) .................................. 2014-129582

(51) Int. Cl.
*H01M 4/485*    (2010.01)
*H01M 2/30*    (2006.01)
(Continued)

(52) U.S. Cl.
CPC ............. *H01M 4/485* (2013.01); *H01M 2/30* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 2002/0081489 A1* | 6/2002 | Ng ......................... H01M 2/26 429/161 |
| 2003/0194605 A1* | 10/2003 | Fauteux .................. H01M 2/26 429/149 |
| 2010/0190081 A1* | 7/2010 | Park ...................... H01M 2/206 429/452 |

FOREIGN PATENT DOCUMENTS

| JP | A 2000-215884 | 8/2000 |
| JP | A 2000-294253 | 10/2000 |

(Continued)

OTHER PUBLICATIONS

Machine Translation of JP 2004-055425 A (Year: 2004).*

Primary Examiner — Robert S Carrico
(74) Attorney, Agent, or Firm — Muncy, Geissler, Olds & Lowe, P.C.

(57) ABSTRACT

A non-aqueous electrolyte secondary battery comprising an enclosure in which plural kinds of positive electrodes having a positive electrode active material; a non-aqueous electrolyte; a negative electrode containing a titanium compound as a main component of a negative electrode active material; and a separator held between the positive electrode and the negative electrode and formed from an electrical insulating material are enclosed, which comprises a separator-holding negative electrode which is held by the separator from both sides thereof and is disposed between one of the positive (Continued)

electrodes and the other one of the positive electrode adjacent thereto, the separator-holding negative electrode serving as the negative electrode, and wherein the plural kinds of the positive electrodes comprises a first positive electrode containing a layered rock salt compound as the positive electrode active material, and a second positive electrode whose main component is a positive electrode active material different in kind from the layered rock salt compound. According to the battery, even when the titanium compound is used for the negative electrode, the amount of gas generated during a cycle test is remarkably decreased, and the cycle stability is excellent.

13 Claims, 2 Drawing Sheets

(51) Int. Cl.
*H01M 4/505* (2010.01)
*H01M 4/525* (2010.01)
*H01M 10/0525* (2010.01)
*H01M 10/0585* (2010.01)
*H01M 10/42* (2006.01)

(52) U.S. Cl.
CPC ... *H01M 10/0525* (2013.01); *H01M 10/0585* (2013.01); *H01M 10/4235* (2013.01)

(56) References Cited

FOREIGN PATENT DOCUMENTS

| | | | |
|---|---|---|---|
| JP | 2004055425 A | * | 2/2004 |
| JP | A 2006-032279 | | 2/2006 |
| JP | A 2006-032280 | | 2/2006 |
| JP | A 2006-318868 | | 11/2006 |
| JP | 2011-044312 | | 3/2011 |
| WO | WO 2012/023501 A1 | | 2/2012 |

* cited by examiner

NON-AQUEOUS ELECTROLYTE SECONDARY BATTERY, AND BATTERY PACK OBTAINED BY CONNECTING PLURALITY OF NON-AQUEOUS ELECTROLYTE SECONDARY BATTERIES

CROSS REFERENCE TO RELATED APPLICATIONS

This application is a national stage application of PCT/JP2015/068102 filed on Jun. 23, 2015, which is based on and claims priority to Japanese Patent Applications No. 2014-129582 filed on Jun. 24, 2014, the disclosures of which are incorporated herein by reference.

TECHNICAL FIELD

The present invention relates to a non-aqueous electrolyte secondary battery, and a battery pack using the same.

BACKGROUND ART

Recently, non-aqueous electrolyte secondary batteries have been actively researched and developed for use of portable devices, hybrid cars, electric cars, or storage of electricity for home use. The non-aqueous electrolyte secondary battery used in these fields requires a high safety. In order to satisfy the requirement, a battery has been developed which uses a titanium compound as a negative electrode active material. The battery using the titanium compound as the negative electrode active material, however, has a problem in which an electrolytic solution is reacted with the negative electrode active material to generate gas, whereby a cycle stability is reduced.

In order to consume the gas generated in the battery, for example, Patent Document 1 has developed a technique in which a gas-removing agent containing an organic polymer having a double bound and a catalyst is introduced into an outside of an active battery volume part, whereby the gas generated in the battery during operation can be consumed. The technique, however, is applied to an alkaline dry cell, and the document does not refer to the effects on the non-aqueous electrolyte secondary battery at all. In the non-aqueous electrolyte secondary battery, the performance is remarkably deteriorated by moisture, and thus the incorporation of the gas-removing agent into the outside of the active battery volume part is not suitable for the non-aqueous electrolyte secondary battery.

Patent Document 2 describes that when spinel type lithium manganate is used as a positive electrode active material, the amount of gas generated in the battery can be reduced by adding lithium cobaltate or lithium nickelate. In such a mixed positive electrode, however, the different positive electrode active materials, i.e., the spinel type lithium manganate, and the lithium cobaltate or the lithium nickelate, are exposed to the same potential environment during charge and discharge, and the latter materials are deteriorated, thus resulting in, sometimes, reduction of a capacity retention in a cycle test for a long period of time. The improvement thereof is necessary.

Patent Documents 3 to 5 disclose that positive electrodes are formed from a plurality of layers of a positive electrode active material layer containing a spinel type lithium manganate and a positive electrode active material layer containing lithium cobaltate. It can be considered that these techniques have a certain effect to inhibit the gas generation, but the cycle characteristics are reduced, which may be caused by the lithium cobaltate, during a cycle test, and thus these techniques must be improved.

CITATION LIST

Patent Literature

Patent Document 1: JP-A No. 2000-294253
Patent Document 2: JP-A No. 2000-215884
Patent Document 3: JP-A No. 2006-032279
Patent Document 4: JP-A No. 2006-032280
Patent Document 5: JP-A No. 2006-318868

SUMMARY OF THE INVENTION

Technical Problem

There has been a problem in which when a titanium compound is used as a negative electrode active material of a non-aqueous electrolyte secondary battery, gas is generated, thus resulting in reduction of the cycle stability.

Solution to Problem

In view of the circumstances described above, the present inventors have repeated painstaking studies. As a result, they have found that when two kinds of different positive electrodes are used as the positive electrode, which are a first positive electrode which contains a positive electrode active material containing as a main component a layered rock salt compound, and a second positive electrode which contains a positive electrode active material containing as a main component a positive electrode active material different in kind from the layered rock salt compound, and the states-of-charge of the positive electrodes are independently controlled, then even when a negative electrode using a titanium compound as a negative electrode active material is used, the gas generation is inhibited and the cycle characteristics are stabilized.

The present invention relates to a non-aqueous electrolyte secondary battery comprising an enclosure in which plural kinds of positive electrodes having a positive electrode active material; a non-aqueous electrolyte; a negative electrode containing a titanium compound as a main component of a negative electrode active material; and a separator held between the positive electrode and the negative electrode and formed from an electrical insulating material are enclosed, which includes a separator-holding negative electrode which is held by the separator from both sides thereof and is disposed between one of the positive electrodes and the other one of the positive electrode adjacent thereto, the separator-holding negative electrode serving as the negative electrode, and wherein the plural kinds of the positive electrodes includes a first positive electrode containing a layered rock salt compound as the positive electrode active material (hereinafter which may sometimes be referred to as a "first positive electrode active material), and a second positive electrode whose main component is a positive electrode active material different in kind from the layered rock salt compound (hereinafter which may sometimes be referred to as a "second positive electrode active material).

A preferred aspect is the non-aqueous electrolyte secondary battery described above, wherein the negative electrodes held by separators are disposed on both sides of the all positive electrodes. The first positive electrode is charged from the two negative electrodes disposed on the both sides thereof and thus the gas inhibitory effect can be exhibited by the minimum amount of the first positive electrode active material, thus resulting in the increased energy density.

A preferred aspect is the non-aqueous electrolyte secondary battery described above, wherein the first positive electrode is not discharged by connection to at least an external load except for self-discharge during the discharge of the non-aqueous electrolyte secondary battery, and maintained in the enclosure while the state-of-charge is kept at a certain level. As the first positive electrode is kept in the state-of-charge for a long period of time, the effect of absorbing the gas generated is maintained in this state-of-charge for a long period of time, and thus the amount of the gas generated can be decreased.

A preferred aspect is the non-aqueous electrolyte secondary battery described above, which further includes terminals connected individually to the first positive electrode, the second positive electrode, and the negative electrode and having a terminal-extending part which extends outward from the enclosure, and wherein the terminal-extending part of the terminal connected to the first positive electrode exists apart from the terminal-extending part of the terminal connected to the second positive electrode. The self-discharge of the first positive electrode is inhibited, and the effect of decreasing the amount of the gas generated is sustained for a long period of time.

A preferred aspect is the non-aqueous electrolyte secondary battery described above, wherein the titanium compound is one or more compounds selected from the group consisting of titanium compounds shown by $Li_4Ti_5O_{12}$, $H_2Ti_{12}O_{25}$, and $TiO_2$.

A preferred aspect is the non-aqueous electrolyte secondary battery described above, wherein the layered rock salt compound is one or more layered rock salt compounds selected from the group consisting of lithium cobaltate, lithium cobalt-nickel-aluminate, and lithium cobalt-nickel-manganate.

A preferred aspect is the non-aqueous electrolyte secondary battery described above, wherein the positive electrode active material different kind from the layered rock salt compound is a spinel type lithium manganate.

In addition, the present invention relates to a battery pack including a plurality of non-aqueous electrolyte secondary batteries of the present invention connected to each other.

Advantageous Effects of Invention

According to the non-aqueous electrolyte secondary battery of the present invention, even when the titanium compound is used as the negative electrode, the amount of gas generated during a cycle test is remarkably decreased, and the cycle stability is excellent.

DESCRIPTION OF EMBODIMENTS

Using FIG. 1, explanations of one embodiment of the present invention are as described below. The present invention is not limited to the explanations described below.

Figure 1:
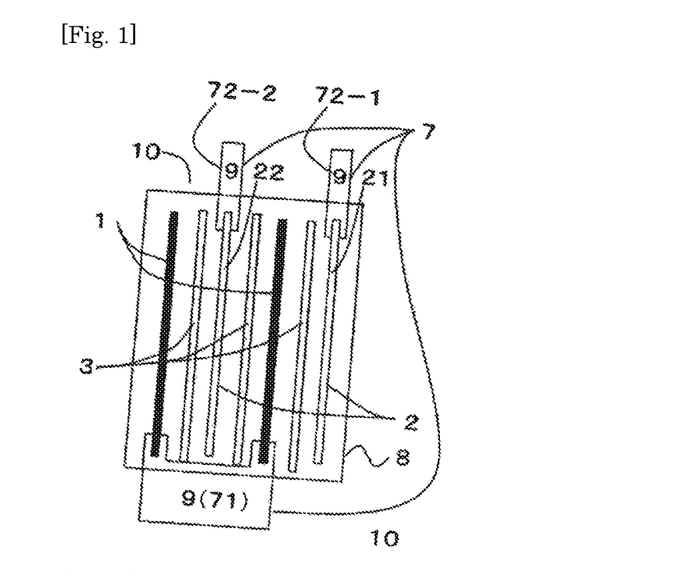
FIG. 1 is a cross-sectional conceptual view showing one embodiment of non-aqueous electrolyte secondary battery 10 of the present invention.

FIG. 1 is a cross-sectional conceptual view showing one embodiment of non-aqueous electrolyte secondary battery 10 of the present invention.
<Non-Aqueous Electrolyte Secondary Battery 10>

A non-aqueous electrolyte secondary battery 10 of the present invention has an enclosure 8 in which plural kinds of positive electrodes 2; a non-aqueous electrolyte; a negative electrode 1; and a separator 3 held between the positive electrode 2 and the negative electrode 1 and formed of an electrical insulating material are enclosed. In the enclosure 8 used in the present invention, a non-aqueous electrolyte used in the present invention, which carries out a lithium ion conduction, exists on at least the surfaces and the insides of the positive electrodes 2, the negative electrode 1, and the separator 3.

A terminal 7 is individually connected to at least each of the positive electrodes 2 and the negative electrode 1, and the terminal 7 has a terminal-extending part 9 extending outward from at least the enclosure 8 used in the present invention. Here, the first positive electrode 21 and the second positive electrode 22 may be connected to the same positive electrode terminal 72 or to the different positive electrode terminals 72-1 and 72-2. It is preferred to connect them to the different positive electrode terminals 72-1 and 72-2, because the gas generation-inhibitory effect of the present invention is more effectively improved by individually controlling the first positive electrode 21 and the second positive electrode 22 to different potential environments.

Accordingly, it is preferred that as the terminal-extending part 9 of each terminal 7, at least each part of the three kinds of the terminals of the negative electrode terminal 71, the first positive electrode terminal 72-1, and the second positive electrode terminal 72-2 extends outward from the enclosure 8 in the non-aqueous electrolyte secondary battery 10 of the present invention. Of course, a plurality of first positive electrodes 21, a plurality of second positive electrodes 22, and a plurality of negative electrodes 1 may exist. When the plurality of the first positive electrodes 21 exist, for example, when the total number of the first positive electrodes 21 is set to A, the plurality of the first positive electrodes 21 may be connected to a plurality of the different first positive electrode terminals 72-1 so that B electrodes in the A electrodes are connected to a first positive electrode terminal 72-1-1 (not shown), and (A-B) electrodes are connected to a first positive electrode terminal 72-1-2 (not shown). It is preferred that one terminal-extending part per each of the three kinds of terminals of the negative electrode terminal 71, the first positive electrode terminal 72-1, and the second positive electrode terminal 72-2, i.e. three terminal-extending parts 9 in total, extend from the enclosure 8, in terms of economy and operability.

When the battery of the preferred embodiment of the present invention is used in the preferred aspect, the first positive electrode 21 and the second positive electrode 22, used in the present invention, are in the different potential environments. Thus, in order to prevent a short circuit between them, it is preferred that the terminal-extending part 9 of the first positive electrode terminal 72-1 exists apart from the terminal-extending part 9 of the second positive electrode terminal 72-2, and it is more preferred that they are electrically insulated from the ambient environment of the enclosure 8.

As described above, when the terminal-extending part 9 of the first positive electrode terminal 72-1 and the terminal-extending part 9 of the second positive electrode terminal 72-2 are separately formed, i.e., the first positive electrode terminal 72-1 and the second positive electrode terminal 72-2 are separately formed, and the different positive electrode terminals 7 are, separately, electrically connected to the electrodes, then the positive electrode terminal 72-1 of the first positive electrode 21 is physically brought into non-contact with the positive electrode terminal 72-2 of the second positive electrode 22, and the first positive electrode 21 is not electrically communicated with the second positive electrode 22 in terms of electronic or hole conduction except for the ionic conduction. It is preferred that the different positive electrode terminals 7 are electrically non-communicated or electrically insulated in this sense. It is possible to separately control the first positive electrode 21 and the second positive electrode 22 in the different potential environments; it is possible to further stabilize the cycle characteristics of the non-aqueous electrolyte secondary battery of the present invention; and the life of the non-aqueous electrolyte secondary battery of the present invention can be prolonged.

It is more preferred that the first positive electrode 21 is charged up to a pre-determined state-of-charge, and then the first positive electrode 21 is continuously electrically isolated during the subsequent charge and discharge. A method of performing the above is not particularly limited, and in a case in which the first positive electrode 21 and the second positive electrode 22 are connected to the different positive electrode terminals 72, a preferred embodiment is exemplified by a method in which after the first positive electrode 21 is charged up to a pre-determined state-of-charge using the first positive electrode terminal 72-1 and the negative electrode terminal 71, the terminal-extending part 9 of the first positive electrode terminal 72-1 is covered with an insulating sheet, and then the charge and discharge is performed using the second positive electrode terminal 72-2 and the negative electrode terminal 71.

In order to easily perform such a charge and discharge or to reduce the cost, in case in which one or more first positive electrodes 21 and one or more second positive electrodes 22, used in the present invention, are separately enclosed in the enclosure 8 used in the present invention, it is preferred that all of the first positive electrodes 21 are connected to the same first positive electrode terminal 72-1, and all of the second positive electrodes 22 are connected to the same second positive electrode terminal 72-2.

The non-aqueous electrolyte secondary battery of the present invention preferably has an enclosure as a main body which is formed by winding a laminate formed of a negative electrode/a separator/a positive electrode or laminating a plurality of the laminates through a separator and attaching necessary parts thereto to form an electrode group used in the present invention, and then enclosing the electrode group in an exterior of a laminated film or the like. The enclosure may be enclosed by a rectangle, elliptic, cylindrical, coin-shaped, button-shaped, or sheet-shaped metal can. In order to easily dispose the first positive electrode used in the present invention, a laminate battery having an enclosure in which the laminate having the separator intervened is wrapped with a laminated film is more preferred.

The enclosure and the exterior may have a mechanism of releasing gas generated in the enclosure. The gas-catching mechanism may be provided, for example, as a gas-catching bag in the enclosure. The number of layers in the laminate can be appropriately set so as to exhibit a desired potential value or battery capacity.

(First Positive Electrode)

The battery of the present invention has, in addition to the second positive electrode which is used for regular charge and discharge, the first positive electrode for obtaining the gas generation-inhibitory effect of the invention. The first positive electrode, used in the present invention, contains a specific active material, specifically a layered rock salt compound. In the following descriptions, a reference number of each structural member may sometimes be omitted.

As described above, it is preferred that the first positive electrode, used in the present invention, is charged up to a pre-determined state-of-charge level, and then is subjected to the use of regular charge and discharge in an electrically isolated state; it is more preferred that only the first positive electrode is separately charged if a charge amount of the first positive electrode in the state-of-charge is decreased, interposing a period during which the regular charge and discharge is performed, in order to maintain the effects of the present invention for a long period of time; and it is even more preferred that the charge described above is separately performed when the state-of-charge of the first positive electrode is determined and it reaches less than the pre-determined state-of-charge.

The pre-determined state-of-charge of the first positive electrode is a state-of-charge explained below. In a half cell using the first positive electrode as an actuation electrode and lithium as a counter electrode, constant current constant potential charge is performed at 4.25 V using the lithium electrode as the standard, and a state-of-charge when the current value observed reaches equal to or lower than 0.02 C (1/50 hour), which is a current at which the discharge of a battery having the pre-determined battery capacity is finished for 50 hours, is defined as SOC 100%. SOC 10% or more and SOC 100% or less is preferred because it greatly contributes to the gas inhibition, SOC 20% or more and SOC 95% or less is more preferred because the gas inhibitory effect is particularly large, and SOC 30% or more and SOC 90% or less is particularly preferred because the deterioration of the first positive electrode can be inhibited.

One or more first positive electrodes used in the present invention can be put in the enclosure used in the present invention. The total weight of the positive electrode active materials in the first positive electrodes is preferably 1% or more and less than 10%, more preferably from 2% to 5%, because of the good balance between the gas inhibitory effect and the energy density, of the total weight of the positive electrode active materials in the second positive electrodes, one or more second positive electrodes being, similarly, able to be put in the enclosure used in the present invention. In the case in which the first positive electrode is electrically isolated in the pre-determined state-of-charge, the capacity therefrom does not contribute to the actual charge and discharge, and thus when the amount of the active materials of the first positive electrodes is larger than the amount of the active materials of the second positive electrodes, the energy density of the battery is reduced to that extent.

The position of the first positive electrode in the enclosure, used in the present invention, is not particularly limited, and in a case in which the laminates are laminated, an embodiment is preferred in which the first positive electrode is disposed outside the second positive electrode on a cross-section when the electrode group is cut in a laminating direction, because of the large gas inhibitory effect.

(Battery Pack)

The non-aqueous electrolyte secondary battery of the present invention can have a plurality of the enclosures used in the present invention, and in such a case, it is preferred that the negative electrode terminals 71 in the enclosures are connected in series or in parallel and the second positive electrode terminals 72-2 are connected in series or in parallel (it is preferred that when the negative electrode terminals 71 are connected in series, the second positive electrode terminals 72-2 are also connected in series, and when the negative electrode terminals 71 are connected in parallel, the second positive electrode terminals 72-2 are also connected in parallel), thereby forming a non-aqueous electrolyte secondary battery having the battery negative electrode terminal and the battery positive electrode terminal as two terminals of the battery itself. In such a case, it is also more preferred that the first positive electrode terminal 72-1 in each enclosure is not connected and the isolation thereof from the ambient environment is maintained.

The battery pack of the present invention can be formed by connecting a plurality of the non-aqueous electrolyte secondary batteries of the present invention as described above, i.e., appropriately connecting the battery negative electrode terminal and the battery positive electrode terminal. The battery terminals are appropriately connected in series or in parallel depending on the desired size, capacity, and voltage. In addition, in order to confirm the state-of-charge of each battery and improve the safety, it is preferred that a control circuit is attached to the battery pack.

(Positive Electrode and Negative Electrode)

The positive electrode and the negative electrode, used in the present invention, are parts in which an active material of each electrode, contributing to an electrode reaction, exists, and a member containing the part is referred to as a "positive electrode member" or a "negative electrode member", which includes, for example, an electric collector described below, and the terminal. In the present specification, the positive electrode and the negative electrode are not the members, but are parts where the active material of each electrode exists.

It is preferred that the positive electrode member and the negative electrode member is produced by forming a material layer containing the active material of each electrode on a conductive electric collector, and connecting a conductive terminals thereto, in the terms of the reduction of an internal resistance of the battery. The positive electrode and the negative electrode in the present specification just refer to parts in which the material layer is formed and which is enclosed in the enclosure used in the present invention. The electric collector and the terminals may be formed as different members, but they may be formed into an integrated member including the electric collector part and the terminal part.

In such a positive electrode member or negative electrode member used in the present invention, at least the material layers of the electrodes, which are the positive electrode and the negative electrode, the electric collector part, and a part of the terminal part of each electrode are enclosed in the enclosure used in the present invention, and the extending parts of the terminals are drawn out and extend from the enclosure. The terminal-extending parts are electrically connected to external devices and used for charge and discharge.

An external area on which an electrode reaction with each positive electrode or each negative electrode, used in the present invention, occurs, i.e., an area of an external surface which is opposite to the electric collector of the electrode material layer and is exposed to the non-aqueous electrolyte, used in the present invention, in the enclosure (which may be referred to as an "electrode reaction surface" in the present specification) has preferably a variation or a ratio of the maximum area/the minimum area of 1 or more and 1.3 or less, in order to enhance the uniformity of the electrode reaction at each electrode, thereby obtaining a battery with a high reliability, and to make the battery compact. More preferably, the areas of the all positive electrodes or the areas of the all negative electrodes are made the same, even more preferably the areas of the all positive electrodes are made the same and the areas of the all negative electrodes are made the same. The area of the electrode reaction surface of the positive electrode and the area of the electrode reaction surface of the negative electrode can be controlled, for example, by controlling a coating width of slurry for forming the material layer when the slurry is coated on the electric collector, which is a preferred aspect.

With respect to an electric capacity of each positive electrode per unit area, and an electric capacity of each negative electrode per unit area, a variation or a ratio of (an electric capacity per the maximum area)/(an electric capacity per the minimum area) is preferably 1 or more and 1.3 or less, in order to enhance the uniformity of the electrode reaction at each electrode, thereby obtaining a battery with a high reliability, and to make the battery compact. More preferably, the electric capacities per area of the all positive electrodes or the electric capacities per area of the all negative electrodes are made the same, even more preferably the electric capacities per area of all the positive electrodes are made the same and the electric capacities per area of all the negative electrodes are made the same. The electric capacity per unit area of the positive electrode and the electric capacity per unit area of the negative electrode can be controlled by controlling a weight of the material layer per unit area of the electric collector when the material layer is formed on the electric collector, which is a preferred aspect, for example, by controlling a coating thickness when the material layer is formed by coating.

When the electric capacities per area of all the positive electrodes are made the same and the electric capacities per area of all the negative electrodes are made the same, it is preferred that a ratio of the electric capacity per area of the positive electrode to the electric capacity per area of the negative electrode satisfies the following formula (1), in order to obtain a battery with the high reliability by keeping balance between the electrode reaction at the positive electrode and the electrode reaction at the negative electrode. It is more preferred that D is larger than C.

[Formula 1]

$$1 \leq D/C \leq 1.2 \tag{1}$$

In the formula (1), C represents an electric capacity per $cm^2$ of a positive electrode, and D represents an electric capacity per $cm^2$ of a negative electrode.

When D/C is less than 1, the capacity of the negative electrode may possibly be smaller than the capacity of the positive electrode on the negative electrode and the positive electrode opposing to each other, and thus the potential of the negative electrode reaches a deposition potential of lithium on overcharge, resulting in occurrence of a risk in which the battery may be short-circuited. Meanwhile, when D/C is more than 1.2, the negative electrode active material, which is not involved in the battery reaction, may possibly cause an excessive side-reaction on the negative electrode and the positive electrode opposing to each other, and thus unnecessary gas generation may occur due to the side-reaction in the enclosure.

When the areas of the electrode reaction surfaces of the all positive electrodes are made the same and the areas of the electrode reaction surfaces of the all negative electrodes are made the same, and the electric capacities per area of the all positive electrodes are made the same and the electric capacities per area of the all negative electrodes are made the same, it is preferred that an area ratio of the positive electrode to the negative electrode satisfy the following formula (2), in order to obtain a battery with the high reliability by keeping balance between the electrode reaction at the positive electrode and the electrode reaction at the negative electrode. It is more preferred that F is larger than E.

[Formula 2]

$$1 \leq F/E \leq 1.2 \tag{2}$$

In the formula (2), E represents an area of the positive electrode, and F represents an area of the negative electrode.

When F/E is less than 1, the capacity of the negative electrode may possibly be smaller than the capacity of the positive electrode, and thus the potential of the negative electrode reaches a deposition potential of lithium on overcharge, resulting in occurrence of a risk in which the battery may be short-circuited. Meanwhile, when F/E is more than 1.2, there is a parts which does not face to the positive electrode on the negative electrode, and the negative electrode active material, which is not involved in the battery reaction, may possibly cause an excessive side-reaction on the part of the negative electrode, and thus unnecessary gas generation may occur due to the side-reaction in the enclosure.

In the present invention, the electric capacity per $cm^2$ of each electrode is preferably 0.5 mAh or more and 6.0 mAh or less per electrode reaction surface, in order to increase the capacity of the battery as well as to increase the power density in well-balanced state. The positive electrode has more preferably an electric capacity of 3.0 mAh or less. When the electric capacity is too small, the size of the battery may be made large in order to obtain a desired capacity. Meanwhile, the smaller the power density, the larger the electric capacity. The electric capacity per unit area of each electrode can be calculated by producing each electrode, producing a half cell using metal lithium as a counter electrode, and measuring a charge-discharge behavior of the half cell.

(Electric Collector)

The positive electrode and the negative electrode, used in the present invention, is preferably an electrode in which a material layer containing an active material is formed on an electric collector, and more preferably material layers forming the same electrode are formed on both sides of the electric collector, in order to obtain a compact battery having a high performance.

Electric collectors having various shapes may be used so long as they have conductivity and can be used as a core material of each electrode. It is preferred to use an electric collecting foil sheet or film, which is inexpensive and easily obtainable.

As the material for the electric collector, a material which is aluminum, aluminum alloy, or a metal other than aluminum (copper, stainless steel, nickel, titanium, or alloy thereof) whose surface is coated with a metal which is not reacted at a potential of the positive electrode or the negative electrode (for example, aluminum for the positive electrode and aluminum or copper for the negative electrode) may be used. Aluminum is preferred, because it is inexpensive and easily obtainable. In particular, as the electric collector material used for the positive electrode, high purity aluminum represented by JIS 1030, 1050, 1085, 1N90, 1N99, and the like, are more preferred, in terms of the stability in a positive electrode reaction atmosphere.

In some cases, it is possible to use as an electric collector a conductive film produced by forming a conductive thermoplastic resin composition containing a thermoplastic resin and a conductive material into a film. The conductive material may include carbon materials such as carbon black, various metal powders, and the like.

The thickness of the electric collector is not particularly limited, and it is preferably 10 μm or more and 100 μm or less. When the thickness is less than 10 μm, the handling becomes difficult in terms of the production, and when it is more than 100 μm, the economy becomes disadvantageous.

(Material Layer)

The material forming the material layer contains at least the active material of each electrode, and may further include a conductive assistant or a binder for improving the performance of the active material layer. It is preferred that the positive electrode or the negative electrode is produced by forming from the mixture containing the materials on the electric collector as the material layer.

As a method for forming the material layer, a method is preferred in which a slurry is produced from a mixture containing the active material, a conductive assistant, a binder, and the like and a solvent, the resulting slurry is coated on an electric collector, and it is dried to remove the solvent, in terms of easiness of the forming method.

The material layer is preferably compressed to a desired thickness and density after the formation thereof. The compressing method is not particularly limited, and the compression can be performed, for example, by using a roll press, a hydraulic press, or the like.

The thickness of the material layer is preferably 10 μm or more and 200 μm or less after rolling when the layer is subjected to the rolling as a preferred aspect. When the thickness is 10 μm or less, there are cases in which it is difficult to obtain a desired capacity, and when it is more than 200 μm, there are cases in which it is difficult to obtain a desired power density.

The density of the material layer is preferably 1.0 $g/cm^3$ or more and 4.0 $g/cm^3$ or less after rolling when the layer is subjected to the rolling as a preferred aspect. When the density is less than 1.0 $g/cm^3$, the contact between the active material of each electrode and the electric collector or the conductive assistant is insufficient to reduce the electric conductivity, thus resulting in the increased internal resistance of the battery. Meanwhile, when it is more than 4.0 $g/cm^3$, the non-aqueous electrolyte is difficult to penetrate into the material layer of each electrode to reduce the lithium conductivity, thus also resulting in the increased internal resistance of the battery.

In particular, by performing the rolling, which is a preferred aspect, the density of the material layer of the positive electrode is more preferably 2.0 $g/cm^3$ or more, even more preferably 2.2 $g/cm^3$ or more and 3.5 $g/cm^3$ or less, particularly preferably 2.5 $g/cm^3$ or more and 3.0 $g/cm^3$ or less because of the most balanced state.

A method for forming the material layer on the electric collector is not particularly limited, and, for example, a method in which the slurry is coated using a doctor blade, a die coater, a comma coater, or the like and then the solvent is removed and a method in which the slurry is spray-coated and then the solvent is removed are preferred.

As a method for removing the solvent, drying using an oven or a vacuum oven is easy and preferred. The atmosphere in which the solvent is removed may include air at room temperature or a high temperature, an inert gas, a vacuum state, and the like. The temperature at which the solvent is removed is not particularly limited, and it is preferably 60° C. or higher and 300° C. or lower, more preferably 80° C. or higher and 250° C. or lower, even more preferably 200° C. or lower, in order to shorten the time necessary for removal of the solvent while the decomposition of the material layer materials or the deterioration of the binder are prevented. With respect to the order of the formation of the material layer of each electrode, any layer may be formed in advance or later.

A method for producing the slurry is not particularly limited, and it is preferred to use a revolving/rotating mixer, a ball mill, a planetary mixer, a jet mill, or a thin film rotating mixer, because the mixture containing the active material, the conductive assistant, the binder, and the like is uniformly mixed with the solvent. It is more preferred to use the revolving/rotating mixer, the planetary mixer, or the thin film rotating mixer, in terms of the workability. A method for producing the slurry is not particularly limited, and the solvent may be added to the mixture, or the mixture and the solvent are mixed together.

The solvent is preferably a non-aqueous solvent or water. The non-aqueous solvent is not particularly limited, and may include, for example, N-methyl-2-pyrrolidone (NMP), dimethyl formamide, dimethyl acetamide, methyl ethyl ketone, methyl acetate, ethyl acetate, tetrahydrofuran, and the like. The solvent may contain a dispersing agent or thickener.

The slurry has preferably a solid concentration of 30 wt % or more and 80 wt % or less, in order to adjust the viscosity to a value suitable for the formation of the material layer.

(Active Material of Each Electrode)

The active material of each electrode is generally provided as a powder.

When the slurry of the mixture is produced using the active material powder, the bulk density of the active material powder of each electrode is preferably 0.2 g/cm$^3$ or more and 2.2 g/cm$^3$ or less, more preferably 2.0 g/cm$^3$ or less, in order to easily mix with the conductive assistant and the binder, while the necessary solvent amount is kept appropriate.

The active material powder has preferably a number average particle size in appearance of 0.2 µm or more and 50 µm or less, more preferably 0.5 µm or more and 30 µm or less, even more preferably 1 µm or more and 30 µm or less, particularly preferably 3 µm or more and 20 µm or less, in terms of the handling property. The number average particle size in appearance refers to a number average particle size of a secondary particle in which primary particles are aggregated, and also refers to a value obtained by measuring, on an SEM image and a TEM image, a diameter when the particle is a sphere, and the maximum side of each particle when the particle has a shape other than the sphere, and then calculating an average value thereof by dividing by the number of particles. In order to calculate the average value of the number average particle size, it is preferred to observe 10 or more arbitrary particles by the SEM observation.

The active material powder has preferably a specific surface area of 0.05 m$^2$/g or more and 50 m$^2$/g or less, more preferably 0.1 m$^2$/g or more and 20 m$^2$ or less, in order to obtain a desired power density. In particular, the specific surface area of the layered rock salt compound contained in the positive electrode active material of the first positive electrode, used in the present invention, is more preferably 0.1 m$^2$/g or more and 3 m$^2$/g or less, because the inhibition of the gas generation and the inhibition of the material deterioration are well balanced.

In the present specification, the specific surface area is a value, which can be calculated based on the measurement results according to the BET method.

(Conductive Assistant)

The material for the material layer of the positive electrode, used in the present invention, has a poor electronic conductivity, and it is necessary to contain the conductive assistant.

The conductive assistant is not particularly limited, and a carbon material is preferred for the conductive assistant contained in the material layer of the positive electrode because it is inexpensive, and a metal material or a carbon material can be used for the conductive assistant contained in the material layer of the negative electrode. As the metal material, one or more metals selected from the group consisting of copper and nickel are preferred.

The carbon material may include natural graphite, artificial graphite, vapor-grown carbon fiber, carbon nanotube, acetylene black, Ketjen black, furnace black, and the like. The carbon materials may be used alone or as a combination of two or more kinds.

An amount of the conductive assistant contained in the material layer is preferably 1 part by weight or more and 30 parts by weight or less, more preferably 2 parts by weight or more and 15 parts by weight or less, based on 100 parts by weight of the positive electrode active material, in a case of the material layer of the positive electrode; and is preferably 0.5 parts by weight or more and 30 parts by weight or less, more preferably 1 part by weight or more and 15 parts by weight or less because the output and the energy density are well-balanced, based on 100 parts by weight of the negative electrode active material, in a case of the material layer of the negative electrode. When the amounts are adjusted to the range described above, the conductivity of each positive electrode or negative electrode can be secured, the adhesiveness with the binder described below is maintained, and the sufficient adhesiveness between the material layer and the electric collector can be obtained.

(Binder)

It is preferred to contain a binder in the material layer of the positive electrode or the negative electrode, used in the present invention, in order to bind the active material to the electric collector.

The binder is not particularly limited, and it is preferred to use one or more compounds selected from the group consisting of polyvinylidene fluoride (PVdF), polytetrafluoroethylene (PTFE), styrene-butadiene rubber, polyimide, and derivatives thereof.

The amount of the binder contained in the material layer of the positive electrode or the negative electrode, used in the present invention, is preferably 1 part by weight or more and 30 parts by weight or less, more preferably 2 parts by weight or more and 15 parts by weight or less, based on 100 parts by weight of the active material of each electrode, in order to keep the balance between the binding strength and the energy density. When the amount is adjusted to the range described above, the conductivity of the positive electrode or the negative electrode is secured, and the adhesiveness between the active material and the conductive assistant in each electrode is maintained, and the sufficient adhesiveness between the material layer and the electric collector can be obtained.

It is preferred to dissolve or disperse the binder in a non-aqueous solvent or water, in terms of the easy production of the positive electrode or the negative electrode. The non-aqueous solvent is not particularly limited, and may include, for example, N-methyl-2-pyrrolidone (NMP), dimethyl formamide, dimethyl acetamide, methyl ethyl ketone, methyl acetate, ethyl acetate, tetrahydrofuran, and the like. The non-aqueous solvent may contain a dispersing agent and a thickener.

<1. Negative Electrode>

The negative electrode, used in the present invention, has a function to take lithium ions from the electrolyte and to receive electrons through the negative electrode terminal when the battery of the present invention is charged, and a function to release the lithium ions into the electrolyte and to supply the electrons through negative electrode terminal when the battery of the present invention is discharged. It is preferred to produce such a negative electrode as a member in which a material layer (hereinafter which may sometimes be referred to as a "negative electrode active material layer") containing at least the active material (hereinafter which may sometimes be referred to as a "negative electrode active material") is formed on the electric collector. A part of the negative electrode member is enclosed in the enclosure used in the present invention, and the part is drawn out from the enclosure as the negative electrode terminal-extending part, which is electrically connected to an external device.

One of the characteristics of the present invention is that a main component of the negative electrode active material is a titanium compound. The expansion and shrinkage of the titanium compound is smaller than that of conventional negative electrode active materials represented by $LiCoO_2$ in the insertion/desorption reaction of lithium ions. A mixing effect in the non-aqueous electrolyte caused by the expansion and the shrinkage is, accordingly, smaller compared to a case of the conventional negative electrode having the negative electrode active material containing as a main component the conventional negative electrode active material represented by $LiCoO_2$. From the above, it is necessary to secure a negative electrode specific surface area which is larger than that in the conventional negative electrode as a place where the pre-determined number or more of the lithium ions are inserted/deinserted. Accordingly, the specific surface area of the negative electrode, used in the present invention, is preferably 1 $m^2/g$ or more and 100 $m^2/g$ or less. When the specific surface area is less than 1 $m^2/g$, the number of the places where the lithium ions are inserted/deinserted is so small that it may not be possible to take out a desired battery capacity. When it is more than 100 $m^2/g$, a side-reaction other than the insertion/deinsertion of lithium ions, such as a decomposition reaction of the non-aqueous electrolyte, is easily advanced, thus resulting in the possibility in which a desired battery capacity cannot be taken out.

The specific surface area of the negative electrode is preferably 2 $m^2/g$ or more and 70 $m^2/g$, because the place where the lithium ions are inserted/deinserted is secured and the desired capacity can be realized, and less side reactions other than the insertion/deinsertion of lithium ions occur. The specific surface area of the negative electrode is more preferably 3 $m^2/g$ or more and 50 $m^2/g$, because the advance of the side reaction is the smallest, and the well-balanced state can be kept when the lithium ions are inserted/deinserted.

The specific surface area of the negative electrode can be controlled by selection of kinds and mixing ratios of the negative electrode active material, the conductive assistant, and the binder. It can also be controlled by compressing the electrode to a desired thickness.

(Negative Electrode Active Material)

It is necessary that the negative electrode active material, used in the present invention, contains the titanium compound as a main component, i.e., contains the titanium compound in a content of 50% by mass or more, relative to the all negative electrode active materials. It may contain the negative electrode active materials other than the titanium compound, for example, an element other than lithium and titanium, such as Nb in a content of less than 50% by mass. It is preferred that the titanium compound is contained in a content of 80% by mass or more and the negative electrode active material other than the titanium compound is contained in a content of 20% by mass or less, and it is more preferred that the titanium compound may contain the element other than lithium and titanium, such as Nb, in a slight amount.

As the titanium compound, titanic acid compounds, lithium titanate, and titanium dioxide are preferred. In order to improve the conductivity or the stability, the titanium compound may be covered with a carbon material, a metal oxide, a polymer, or the like.

As the titanic acid compound, $H_2Ti_3O_7$, $H_2Ti_4O_9$, $H_2Ti_5O_{11}$, $H_2Ti_6O_{13}$, $H_2Ti_{12}O_{25}$ are preferred, and $H_2Ti_{12}O_{25}$ is more preferred, because the cycle characteristics are stable.

The lithium titanate having a spinel structure or a Ramsdellite structure is preferred. A lithium titanate shown by the molecular formula: $Li_4Ti_5O_{12}$ is more preferred. The spinel structure is preferred because the expansion and shrinkage of the active material is small in the insertion/desorption reaction of the lithium ions.

As the titanium dioxide, an anatase type and a bronze type ($TiO_2(B)$) are preferred, and the bronze type is more preferred, because the insertion/desorption of lithium can be efficiently advanced. A mixture of the anatase type and the bronze type may be used.

<2. Positive Electrode>

The positive electrode, used in the present invention, has a function to release lithium ions into the electrolyte and to supply electrons through the positive electrode terminal when the battery of the present invention is charged, and a function to take lithium ions from the electrolyte and to receive electrons through the positive electrode terminal when the battery of the present invention is discharged. It is preferred to produce such a positive electrode as a member in which a material layer (hereinafter which may sometimes be referred to as a "positive electrode active material layer") containing at least the active material (hereinafter which may sometimes be referred to as a "positive electrode active material") is formed on the electric collector. A part of the positive electrode member is enclosed in the enclosure used in the present invention, and the part is drawn out from the enclosure as the positive electrode terminal-extending part, which is electrically connected to an external device.

The non-aqueous electrolyte secondary battery of the present invention is characterized in that the two kinds of positive electrodes, i.e., the first positive electrode and the second positive electrode are used, and the first positive electrode has the material layer containing the positive electrode active material whose main component is a layered rock salt compound. Each of the first positive electrode and the second positive electrode may be one, or a plurality of the electrodes may be used.

(Positive Electrode Active Material of First Positive Electrode)

In the present invention, an electrode capable of exhibiting the gas generation-inhibitory effect is the first positive electrode having the layered rock salt active material. The mechanism of the gas inhibition is not clear, however, the layered rock salt active material has a gas storage effect, and in particular, it can be considered that when the state-of-charge is maintained, the layered rock salt active material has the higher gas inhibitory effect.

The positive electrode active material of the first positive electrode, used in the present invention, contains necessarily the layered rock salt compound. The layered rock salt compound is preferably contained in a content of 20% by mass or more and 100% by mass or less, more preferably is contained as the main component, i.e., in a content of more than 50% by mass, in order to sufficiently exert the gas generation-inhibitory effect, even more preferably in a content of 80% by mass or more.

The layered rock salt compound, used in the present invention, refers to a compound having a layered rock salt-type structure, which is not particularly limited. The compound may include lithium nickel composite oxide (for example, $LiNiO_2$), lithium cobalt composite oxide ($LiCoO_2$), lithium nickel cobalt composite oxide (for example, $LiNi_{1-y}Co_yO_2$), lithium nickel cobalt manganese composite oxide ($LiNi_xCo_yMn_{1-y-z}O_2$ wherein x+y+z=1), solid solution containing excessive lithium, for example, solid solution of $LiMnO_3$, $Li_2MnO_3$, and $LixMeO_2$, and the like. The lithium cobaltate ($LiCoO_2$), lithium cobalt-nickel-aluminate ($LiNi_{0.8}Co_{0.15}Al_{0.05}O_2$), and lithium cobalt-nickel-manganate ($LiNi_xCo_yMn_{1-y-z}O_2$ wherein x+y+z=1) are preferred, because of the large gas inhibitory effect. The positive electrode active materials may be used alone or as a combination of two or more kinds.

The surface of the layered rock salt compound, used in the present invention, may be coated with an organic substance such as polyethylene glycol, an inorganic substance such as aluminum oxide, magnesium oxide, zirconium oxide, or titanium oxide, or a carbon material.

(Positive Electrode Active Material of Second Positive Electrode)

In the positive electrodes, used in the present invention, the positive electrode subjected to the regular charge and discharge, which is the objective of the battery of the present invention, is the second positive electrode. Accordingly, it is preferred that a material whose expansion and shrinkage is small and which is deteriorated little in the regular charge and discharge is used as the positive electrode active material of the second positive electrode, in order to obtain a battery which maintains the high reliability for a long period of time, and has a long life.

Accordingly, it is necessary that the positive electrode active material of the second positive electrode, used in the present invention, contains as a main component a positive electrode active material which is a different kind from the layered rock salt compound. Here, the term "positive electrode active material which is a different kind from the layered rock salt compound" means the material which is different from the positive electrode active material which is used as the main component in the first positive electrode. More specifically, for example, when a specific layered rock salt compound is used as the main component of the positive electrode active material in the first positive electrode, it is possible to use a layered rock salt compound other than the specific layered rock salt compound as a main component of the positive electrode active material in the second positive electrode.

Specific examples of the positive electrode active material used in the second positive electrode may include lithium manganese composite oxide (such as $LiMnO_2$), lithium nickel composite oxide (such as $LiNiO_2$), lithium cobalt composite oxide (such as $LiCoO_2$), lithium nickel cobalt composite oxide (such as $LiNi_{1-y}Co_yO_2$), lithium nickel cobalt manganese composite oxide ($LiNi_xCo_yMn_{1-y-z}O_2$), spinel type lithium manganate (such as $LiMn_2O_4$), lithium phosphorus oxide having an olivine structure (such as $LiFePO_4$, $LiFe_{1-y}Mn_yPO_4$, $LiCoPO_4$, and the like), and the like, and the spinel type lithium manganate is preferred.

The spinel type lithium manganate is a compound shown by $Li_{1+x}M_yMn_{2-x-y}O_4$ wherein $0 \leq x \leq 0.2$, $0 < y \leq 0.6$, and M is an element belonging to groups 2 to 13 in third and fourth period. M in the formula is at least one element selected from elements belonging to groups 2 to 13 in third and fourth period, and Al, Mg, Zn, Ni, Co, Fe, and Cr are preferred; Al, Mg, Zn, Ni, and Cr are more preferred; and Al, Mg, Zn, and Ni are even more preferred, because it is difficult to cause the manganese elution and the cycle stability is greatly improved. When x<0, the capacity of the positive electrode active material tends to be decreased. When x>0.2, large amounts of impurities such as lithium carbonate tends to be contained. When y=0, the stability of the positive electrode active material tends to be decreased. When y>0.6, large amounts of impurities such as oxide of M tends to be contained.

Of these, because of the large effect of improving the stability, one compound selected from $Li_{1+x}Al_yMn_{2-x-y}O_4$ ($0 \leq x \leq 0.1$ and $0 < y \leq 0.1$), $Li_{1+x}Ni_yMn_{2-x-y}O_4$ ($0 \leq x \leq 0.1$ and $0 < y \leq 0.6$), $Li_{1+x}Mg_yMn_{2-x-y}O_4$ ($0 \leq x \leq 0.1$ and $0 < y \leq 0.1$), $Li_{1+x}Zn_yMn_{2-x-y}O_4$ ($0 \leq x \leq 0.1$ and $0 < y \leq 0.1$), and $Li_{1+x}Cr_yMn_{2-x-y}O_4$ ($0 \leq x \leq 0.1$ and $0 < y \leq 0.1$) is preferred, and $Li_{1+x}Al_yMn_{2-x-y}O_4$ ($0 \leq x \leq 0.1$ and $0 < y \leq 0.1$), $Li_{1+x}Ni_yMn_{2-x-y}O_4$ ($0 \leq x \leq 0.1$ and $0 < y \leq 0.6$), $Li_{1+x}Mg_yMn_{2-x-y}O_4$ ($0 \leq x \leq 0.1$ and $0 < y \leq 0.1$) are particularly preferred, because the larger effects can be obtained. When at least one spinel type lithium manganate selected from the group consisting of $LiNi_{0.5}Mn_{1.5}O_4$, $LiNi_{0.5}Ti_xMn_{1.5-x}O_4$ ($0 < x \leq 0.3$), and $LiNi_{0.5}Fe_xMn_{1.5-x}O_4$ ($0 < x \leq 0.3$), which contain $LiNi_{0.5}Mn_{1.5}O_4$, which is a positive electrode active material of a positive electrode E described below, is used as the positive electrode active material, charge and discharge at a high voltage can be performed, and thus the compounds described above are preferred for such a use.

A preferred combination of the first and the second positive electrode active materials is a combination of a first positive electrode active material whose main component is at least one layered rock salt compound selected from the group consisting of a lithium nickel composite oxide, a lithium cobalt composite oxide, a lithium nickel cobalt composite oxide, a lithium nickel cobalt manganese composite oxide, and a solid solution of lithium manganese composite oxide and lithium transition metal composite oxide, having excessive lithium, and a second positive electrode active material whose main component is at least one lithium compound selected from the group consisting of a layered rock salt compound different from the main component of the first positive electrode active material, and selected from a lithium manganese composite oxide, a lithium nickel composite oxide, a lithium cobalt composite oxide, a lithium nickel cobalt composite oxide, and a lithium nickel cobalt manganese composite oxide, a spinel type lithium manganate, and a lithium phosphorus oxide having an olivine structure.

A more preferred combination may include a combination of a first positive electrode active material whose main component is at least one layered rock salt compound selected from the group consisting of a lithium nickel composite oxide, a lithium cobalt composite oxide, a lithium nickel cobalt composite oxide, a lithium nickel cobalt manganese composite oxide, and a solid solution of lithium manganese composite oxide and lithium transition metal composite oxide, having excessive lithium, and a second positive electrode active material whose main component is a spinel type lithium manganate. An even more preferred combination may include a combination of a first positive electrode active material whose component is at least one selected from the group consisting of lithium cobaltate ($LiCoO_2$), lithium cobalt-nickel aluminate ($LiNi_{0.8}Co_{0.15}Al_{0.05}O_2$), and lithium cobalt-nickel manganate ($LiNi_xCo_yMn_{1-y-z}O_2$ wherein x+y+z=1), and a second positive electrode active material whose main component is a spinel type lithium manganate. A particularly preferred combination may include the even more preferred combination wherein the main component of the second positive electrode active material is the spinel type lithium manganate which is preferred in terms of the charge and discharge at a high voltage.

<3. Separator>

The separator used in the present invention is disposed between the positive electrode and the negative electrode, has a function (lithium ion permeability) to be a medium mediating the conductivity of lithium ions between the electrodes while preventing the conductivity of electrons and holes between the electrodes, and may contain various plasticizers, inhibitors, and flame retardants, as long as the separator which has an electrical insulation, property for allowing, having no conductivity of, at least, electrons and holes, or may be coated with a metal oxide, or the like. It is necessary that the material is made of an electrical insulating material, and it is preferred that it is formed of a material having a specific resistance of at least $10^8$ Ω·cm alone. Examples thereof may include nylon, cellulose, polysulfone, polyethylene, polypropylene, polybutene, polyacrylonitrile, polyimide, polyamide, PET, and a composite woven fabric, non-woven fabric, and microporous membrane of two or more kinds thereof, and the like. In terms of the practical use, at least one member selected from the group consisting of a cellulose non-woven fabric, polypropylene, polyethylene, and PET is preferred, and a cellulose non-woven fabric is more preferred.

An area ratio of the separator and the negative electrode, used in the non-aqueous electrolyte secondary battery of the present invention is not particularly limited, and it is preferred that the area ratio satisfies the following formula (3):

[Formula 3]

$$1 \leq H/G \leq 1.5 \quad (3)$$

In the formula (3), G shows an area of the negative electrode, and H shows an area of the separator.

When H/G is less than 1, the positive electrode is brought into contact with the negative electrode, and when it is more than 1.5, the volume necessary for the exterior becomes too large and a compact battery cannot be obtained, thus resulting in the decreased power density.

The separator has preferably a thickness of 10 μm or more and 100 μm or less. When the thickness is less than 10 μm, the positive electrode may possibly be brought into contact with the negative electrode, and when it is more than 100 μm, the internal resistance of the battery may possibly be increased. The thickness of the separator is more preferably 15 μm or more and 50 μm or less, in terms of the economy and the handling.

<4. Non-Aqueous Electrolyte>

The amount of the non-aqueous electrolyte contained in the enclosure of the non-aqueous electrolyte secondary battery of the present invention is not particularly limited, and is preferably 1.0 mL or more per Ah of the battery capacity, in order to sufficiently secure the conductivity of lithium ions, caused by the electrode reaction, thereby exhibiting a desired battery performance.

The non-aqueous electrolyte may be previously contained in the positive electrode, the negative electrode, and the separator, or it may be added to the electrode group obtained by winding or laminating a product in which the separator is disposed between the positive electrode and the negative electrode.

The non-aqueous electrolyte, used in the present invention, is not particularly limited, and an electrolytic solution in which a solute is dissolved in a non-aqueous solvent, a gel electrolyte in which a polymer is impregnated with an electrolytic solution, obtained by dissolving a solute in a non-aqueous solvent, may be used. The non-aqueous electrolyte, used in the present invention, may contain a slight amount of an additive, such as flame-retardant and a stabilizer.

(Non-Aqueous Solvent)

The non-aqueous solvent is preferably an aprotic solvent, more preferably an aprotic solvent containing an aprotic polar solvent, because it is difficult to cause the decomposition of the solvent at an action potential of the non-aqueous electrolyte secondary battery. The aprotic polar solvent is even more preferably at least one member selected from the group consisting of a cyclic aprotic solvent and a linear aprotic solvent. Particularly preferably, the non-aqueous solvent is a non-aqueous solvent of a cyclic aprotic polar solvent and a linear aprotic polar solvent.

The cyclic aprotic polar solvent may include cyclic carbonate, cyclic ester, cyclic sulfone, cyclic ether, and the like. The cyclic carbonate may include ethylene carbonate, propylene carbonate, fluoroethylene carbonate, butylene carbonate, and the like.

The linear aprotic polar solvent may include acetonitrile, linear carbonate, linear carboxylate, linear ether, and the like. The linear carbonate may include dimethyl carbonate, diethyl carbonate, ethyl methyl carbonate, and the like.

The aprotic non-polar solvent may include hydrocarbons such as hexane and benzene.

More specifically, it is possible to use dimethyl carbonate, methyl ethyl carbonate, diethyl carbonate, dipropyl carbonate, methyl propyl carbonate, ethylene carbonate, fluoroethylene carbonate, propylene carbonate, butylene carbonate, γ-butyrolactone, 1, 2-dimethoxyethane, sulpholane, dioxolane, methyl propionate, or the like. The solvents may be used alone or as a mixture of two or more kinds, and it is preferred to use a mixed solvent of two or more kinds because the solubility of the solute, which is a supporting salt described below, can be improved and the conductivity of lithium ions can be enhanced. It is also possible to use a gel electrolyte in which a polymer is impregnated with an electrolytic solution.

(Solute, which is Supporting Salt)

The solute is not particularly limited and, for example, $LiClO_4$, $LiBF_4$, $LiPF_6$, $LiAsF_6$, $LiCF_3SO_3$, LiBOB (Lithium Bis(Oxalato)Borate), and $LiN(SO_2CF_3)_2$ are preferred, because they are easily dissolved in the non-aqueous solvent, and $LiPF_6$ is more preferred.

The concentration of the solute contained in the electrolytic solution is preferably 0.5 mol/L or more and 2.0 mol/L or less. When the concentration is less than 0.5 mol/L, a desired lithium ion conductivity may possibly be exhibited, and when it is more than 2.0 mol/L, the solute cannot be dissolved any more.

EXAMPLES

The present invention is more specifically explained by means of Examples below, but it is not limited to Examples and may be appropriately varied within a range in which the gist of the present invention is not changed.
(Production of First Positive Electrodes A, A+, B, and C)

A positive electrode A, a positive electrode A+, a positive electrode B, and a positive electrode C were produced as the first positive electrode in the following method using the following commercial material powder, which was a layered rock salt compound, as the positive electrode active material of the first positive electrode.

Positive electrode A and positive electrode A+: $LiCoO_2$
Positive electrode B: $LiNi_{1/3}Mn_{1/3}Co_{1/3}O_2$
Positive electrode C: $LiNi_{0.8}Co_{0.15}Al_{0.05}O_2$ First, 100 parts by weight of the powder described above, 5 parts by weight of a conductive assistant (acetylene black), and 5 parts by weight of a binder (polyvinylidene fluoride, a solid concentration: 8 wt %, an NMP solution) were mixed to produce a slurry of a mixture of the materials above.

Next, an electrode sheet in which the slurry was coated on an aluminum foil (15 μm) was vacuum-dried at 170° C. The obtained sheet was cut into electrodes having sizes of 4 cm×6 cm, whereby a positive electrode was produced as a part of the positive electrode member in which the material layer was formed on the electric collector.

Both of a case in which the coating was performed on one side of the aluminum foil to obtain a single-sided electrode and a case in which the coating was performed on both sides of the aluminum foil to obtain a double-sided electrode were performed, whereby two kinds of electrodes were produced.

With respect to the positive electrode A+, a clearance of a coating machine was controlled during the production of the positive electrode A, whereby a capacity thereof was made larger than that of the positive electrode A.
(Production of Second Positive Electrode D)

A positive electrode D was produced as the second positive electrode in the following method using a powder of $Li_{1.1}Al_{0.1}Mn_{1.8}O_4$, which was spinel type lithium manganate, as the positive electrode active material of the second positive electrode.

Positive electrode D: $Li_{1.1}Al_{0.1}Mn_{1.8}O_4$

First, a powder of $Li_{1.1}Al_{0.1}Mn_{1.8}O_4$ was produced in a method described in a document (Electrochemical and Solid-State Letters, 9 (12), A557 (2006)). An aqueous dispersion containing manganese dioxide, lithium carbonate, aluminum hydroxide, and boric acid was prepared, and a mixed powder was produced by a spray-dry method. At that time, the amounts of the manganese dioxide, the lithium carbonate, and the aluminum hydroxide were adjusted so that the molar ratio of lithium, aluminum, and manganese was 1.1:0.1:1.8. Next, the mixed powder was heated at 900° C. for 12 hours in an air atmosphere, and then heated again at 650° C. for 24 hours. Finally, the resulting powder was washed with water having a temperature of 95° C. and dried to produce a powder of $Li_{1.1}Al_{0.1}Mn_{1.8}O_4$.

Next, using 100 parts by weight of the obtained powder, a slurry was produced in the same manner as described above (Production of first positive electrodes A, B, and C), and the slurry was coated and vacuum-dried to produce a positive electrode D.
(Production of Second Positive Electrode E)

A positive electrode E, which was a high voltage positive electrode, was produced as the second positive electrode in the following method using a powder of $LiNi_{0.5}Mn_{1.5}O_4$, which was a spinel type lithium manganate, as the positive electrode active material of the second positive electrode.

Positive electrode E: $LiNi_{0.5}Mn_{1.5}O_4$

First, a powder of $LiNi_{0.5}Mn_{1.5}O_4$ was produced in a method described in a document ("Solid-state redox potentials for $Li[Me_{1/2}Mn_{3/2}]_{O4}$ (Me: 3d-transition metal) having spinel-framework structures: a series of 5 volt materials for advanced lithium-ion batteries" Journal of Power Sources, Vol. 81-82, pp. 90-94(1999)).

First, lithium hydroxide, manganese hydroxide, and nickel hydroxide were mixed so that a molar ratio of lithium, manganese, and nickel was 1:1.5:0.5. Next, the mixture was heated at 550° C. in an air atmosphere, and then was heated again at 750° C. to produce a powder of $LiNi_{0.5}Mn_{1.5}O_4$.

Next, using 100 parts by weight of the obtained powder, a slurry was produced in the same manner as described above (Production of first positive electrodes A, B, and C), and the slurry was coated and vacuum-dried to produce a positive electrode E.
(Measurement of Capacity of Positive Electrodes A to E)

A capacity of the thus produced positive electrode was measured by performing a charge and discharge test of a half cell in which each positive electrode was used as a working electrode and a Li electrode was used as a counter electrode as shown below. All voltage values described below are values relative to the lithium electrode.

First, each positive electrode, which was a single-sided electrode, was cut into a 16 mmΦ, which was used as a working electrode, and an Li metal plate was cut into 16 mmΦ, which was used as a counter electrode. Using these electrodes, the working electrode (the coating surface of the single-sided electrode was disposed on the inside)/a separator/a counter electrode (the Li metal plate) were laminated in this order in a test cell (an HS cell manufactured by Hohsen Corp.), and 0.15 mL of a non-aqueous electrolyte (solvent=a volume ratio of ethylene carbonate:dimethyl carbonate=3:7, solute=$LiPF_6$=1 mol/L) was added thereto to produce a half cell.

After the half cell was allowed to stand at 25° C. for one day, it was connected to a charge and discharge test device (HJ 1005 SD 8 manufactured by Hokuto Denko Corp.). The half cell was subjected to constant-current charge and constant-current discharge at 25° C. at 0.4 mA, and this cycle was repeated 5 times. The result of the discharged capacity obtained at the 5th time was defined as a capacity of the positive electrode.

At that time, a value of the final voltage in the constant-current charge was set at a value described below in each positive electrode, and a value of the final voltage in the constant-current discharge was set at 3.0 V.

Positive electrode A and Positive electrode A+($LiCoO_2$): 4.25 V
Positive electrode B ($LiNi_{1/3}Mn_{1/3}Co_{1/3}O_2$): 4.25 V
Positive electrode C ($LiNi_{0.8}Co_{0.15}Al_{0.05}O_2$): 4.25 V
Positive electrode D ($Li_{1.1}Al_{0.1}Mn_{1.8}O_4$): 4.5 V
Positive electrode E ($LiNi_{0.5}Mn_{1.5}O_4$): 5.0 V The capacity per unit area of each positive electrode was a value described below.

Positive electrode A ($LiCoO_2$): 1.0 mAh/cm$^2$
Positive electrode A+($LiCoO_2$): 1.6 mAh/cm$^2$
Positive electrode B ($LiNi_{1/3}Mn_{1/3}Co_{1/3}O_2$): 1.0 mAh/cm$^2$
Positive electrode C ($LiNi_{0.8}Co_{0.15}Al_{0.05}O_2$): 1.0 mAh/cm$^2$
Positive electrode D ($Li_{1.1}Al_{0.1}Mn_{1.8}O_4$): 1.6 mAh/cm$^2$
Positive electrode E ($LiNi_{0.5}Mn_{1.5}O_4$): 1.6 mAh/cm$^2$
(Production of Negative Electrode F)

A negative electrode F was produced in the following method using a powder of $Li_4Ti_5O_{12}$, which is lithium titanate, as the negative electrode active material.

Negative electrode F: $Li_4Ti_5O_{12}$

First, a powder of $Li_4Ti_5O_{12}$ was produced in a method described in a document ("Zero-Strain Insertion Material of Li[Li$_{1/3}$Ti$_{5/3}$]O$_4$ for Rechargeable Lithium Cells" Journal of Electrochemical Society, 142, 1431 (1995)). Titanium dioxide and lithium hydroxide were mixed in a molar ratio of titanium and lithium of 5:4, and then the mixture was heated at 800° C. for 12 hours in a nitrogen atmosphere to produce a powder of Li$_4$Ti$_5$O$_{12}$.

Next, 100 parts by weight of the powder, 5 parts by weight of a conductive assistant (acetylene black), and 5 parts by weight in a solid content of a binder (polyvinylidene fluoride, a solid concentration 5 wt %, an NMP solution) were mixed to produce a slurry.

Next the slurry was coated on an aluminum foil (15 μm), which was vacuum-dried at 170° C. to produce a negative electrode F having Li$_4$Ti$_5$O$_{12}$ as the negative electrode active material. Both a single-sided electrode and a double-sided electrode were produced.

(Production of Negative Electrode G)

A negative electrode G was produced in the following method using a powder of TiO$_2$(B), which was bronze type titanium dioxide, as the negative electrode active material.

Negative electrode G: TiO$_2$(B)

First, a powder of TiO$_2$(B) was produced in a method described in a document (Journal of Electrochemical Society, 159, A 49-A54 (2012)). First, titanium dioxide and potassium carbonate were mixed in a molar ratio of 4:1, and then the mixture was subjected to heating at 1000° C. for 24 hours in the atmosphere twice to obtain K$_2$Ti$_4$O$_9$. The resulting K$_2$Ti$_4$O$_9$ was treated with a 1.0 M aqueous hydrochloric acid solution to obtain H$_2$Ti$_4$O$_9$. The obtained compound was heated at 500° C. for 0.5 hours in an air atmosphere to produce a powder of TiO$_2$(B).

Next, using 100 parts by weight of the powder, a slurry was produced in the same manner as described above (Production of negative electrode F), and the slurry was coated and vacuum-dried to produce a negative electrode G.

(Production of Negative Electrode H)

A negative electrode G was produced in the following method using a powder of H$_2$Ti$_{12}$O$_{25}$, which was a titanate compound, as the negative electrode active material.

Negative electrode H: H$_2$Ti$_{12}$O$_{25}$

First, a powder of H$_2$Ti$_{12}$O$_{25}$ was produced in a method described in a document (Journal of Electrochemical Society, 158, A546-A549 (2011)). First, titanium dioxide and sodium carbonate were mixed in a molar ratio of 3:1, and then the mixture was subjected to heating at 800° C. for 20 hours in the atmosphere twice to obtain Na$_2$Ti$_3$O$_7$. The resulting Na$_2$Ti$_3$O$_7$ was treated with a 0.5 M aqueous hydrochloric acid solution to obtain H$_2$Ti$_3$O$_7$. The obtained compound was heated at 260° C. for 5 hours in an air atmosphere to produce a powder of H$_2$Ti$_{12}$O$_{25}$.

Next, using 100 parts by weight of the powder, a slurry was produced in the same manner as described above (Production of negative electrode F), and the slurry was coated and vacuum-dried to produce a negative electrode H.

(Measurement of Capacity of Negative Electrodes F to H)

A capacity of the thus produced negative electrode was measured in the same manner as described above (Measurement of capacity of positive electrodes A to E). Current values at the constant-current charge and the constant-current discharge were 0.4 mA, which was the same as described above (Measurement of capacity of positive electrodes A to E).

At that time, a value of the final voltage in the constant-current charge was set at 2.0 V, and a value of the final voltage in the constant-current discharge was set at 1.0 V.

A capacity per unit area of each negative electrode was as follows:

Negative electrode F (Li$_4$Ti$_5$O$_{12}$): 1.7 mAh/cm$^2$

Negative electrode G (TiO$_2$(B)): 1.7 mAh/cm$^2$

Negative electrode H (H$_2$Ti$_{12}$O$_{25}$): 1.7 mAh/cm$^2$ (Production and Evaluation of Non-Aqueous Electrolyte Secondary Battery in Examples 1 to 7 and Comparative Examples 1 and 2)

Using the double-sided electrode, which was prepared by producing as above, a battery from each of Examples 1 to 7 and Comparative Examples 1 and 2 was produced in a manner as described below (Example 1). The produced battery was subjected to a charge and discharge cycle test in a method as described below, and then a capacity retention (%) and an amount of gas generated per unit volume (mL/Ah) during the cycles were measured and evaluated in a method as described below.

Specifically, one kind of a first positive electrode and one kind of a second positive electrode, the total being two kinds, of the battery were selected from the positive electrodes A to E, and one kind of a negative electrode of the battery was selected from the negative electrodes F to H in a combination shown in Table 1, and measurement results are shown in Table 1.

(Method of Charge and Discharge Cycle Test)

The charge and discharge cycle test was performed in a manner in which charge was performed first in the following cycle conditions, then discharge and charge was repeated in the following charge condition 1 and the following discharge condition 1, and finally discharge was performed. A voltage described below is not a lithium reference voltage but a voltage of a non-aqueous electrolyte secondary battery.

[Cycle Conditions]

Battery environment temperature: 60° C.

Unit cycle: One cycle consisted of one charge and one discharge.

The number of cycles repeated: 400 cycles

[Charge and Discharge Condition]

Charge condition 1: Charge was performed at a constant current of 1.0 C until a voltage reached 2.7 V relative to the total capacity of the second positive electrode, after that the charge was performed at a constant voltage while the voltage was maintained at 2.7 V, and then the charge was finished when the current reached 0.02 C.

Discharge condition 1: Discharge was performed at a constant current of 1.0 C until a voltage was decreased to 2.0 V, relative to the total capacity of the second positive electrode, and the discharge was finished when the voltage reached 2.0 V.

(Measurement Methods of Capacity Retention and Amount of Gas Generated)

The capacity retention refers to a percent value of a discharge capacity obtained by repeating charge and discharge in pre-determined conditions described below 400 cycles compared to a discharge capacity at the first cycle.

The amount of gas generated was obtained in a manner in which a gas pocket was previously formed in an aluminum laminated sheet, which was an exterior of an enclosure of a battery, as a part of a volume of the enclosure, gas generated during the charge and discharge cycles was stored in the gas pocket, and volumes of the battery before and after the charge and discharge cycle test were measured by an Archimedes method.

TABLE 1

|  | First positive electrode | Second positive electrode | Negative electrode | Capacity retention (%) | Amount of gas generated (mL/Ah) |
|---|---|---|---|---|---|
| Example 1 | A | D | F | 92 | 0.8 |
| Example 2 | B | D | F | 92 | 0.4 |
| Example 3 | C | D | F | 92 | 0.3 |
| Example 4 | A+ | D | F | 89 | 0.3 |
| Example 5 | A | D | G | 92 | 0.4 |
| Example 6 | A | D | H | 92 | 0.5 |
| Example 7 | A | E | F | 98 | 2.0 |
| Comparative Example 1 | D | D | F | 84 | 5.0 |
| Comparative Example 2 | E | E | F | 82 | 8.8 |

With respect to an evaluation criterion of the produced battery, when a capacity retention was 88% or more, and an amount of gas generated per unit volume was 3 mL/Ah or less after 400 cycles, then the battery was evaluated as acceptance.

As shown in Table 1, all of the batteries of Examples 1 to 7 were evaluated as acceptance, and all of the batteries from Comparative Examples 1 and 2 were evaluated as non-acceptance. In particular, the batteries of Examples 1 to 6 showed a high capacity retention of 88% or more and showed a small amount of gas of 1.0 mL/Ah or less after the cycles, and thus they were excellent batteries.

Meanwhile, the batteries from Comparative Examples 1 and 2 did not have the gas inhibitory effect because the first positive electrode thereof did not contain the layered rock salt compound having the gas inhibitory effect as the positive electrode active material, and thus the gas was generated, the internal resistance was increased, and the capacity retention was low.

In the battery of Example 7, though the positive electrode E ($LiNi_{0.5}Mn_{1.5}O_4$) capable of charging and discharging at a voltage higher than that in the batteries from the other Examples was used as the high voltage positive electrode, the gas amount was small and the capacity retention was high, and thus it can be expected to be used in an application necessary for a high voltage. In the battery of Example 7, the gas amount was larger than that in the batteries of Examples 1 to 6, however, it can be considered that it was caused by existence of gas generated at the positive electrode in addition to the gas generated at the negative electrode.

Example 1

A battery of Example 1 was produced using the positive electrode A as the first electrode, the positive electrode D as the second positive electrode, and the negative electrode F as the negative electrode. A separator used in the production was a cellulose non-woven fabric (25 μm, 30 cm$^2$).

Figure 2:
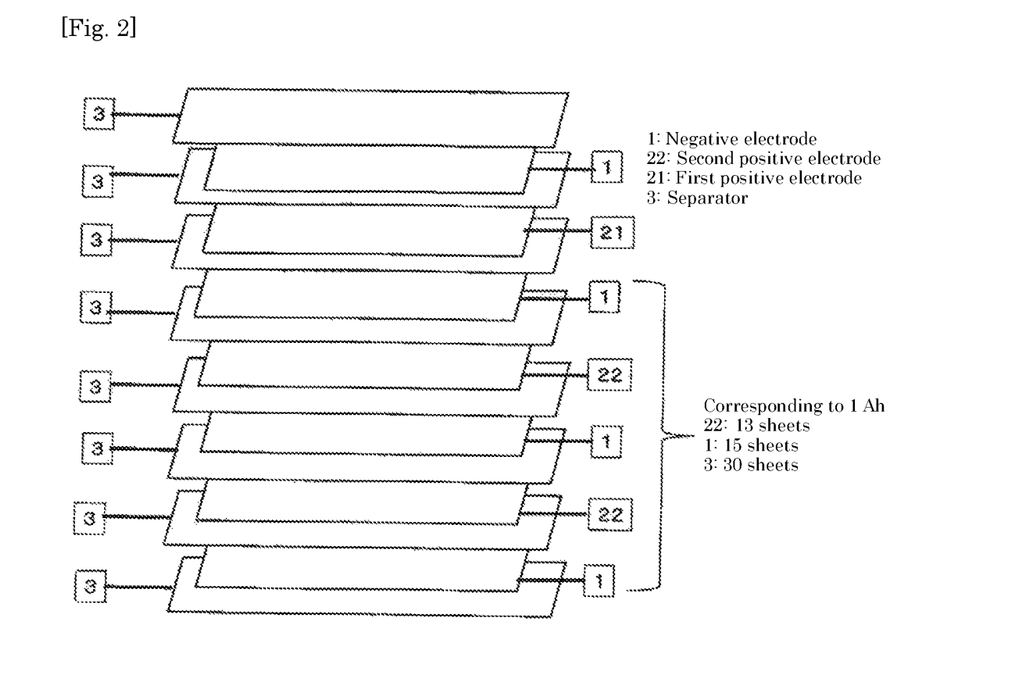
FIG. 2 is a conceptual view showing one embodiment of electrode groups used in the present invention.

First, using the positive electrodes and the negative electrode produced above, the second positive electrode/the separator/the negative electrode were laminated in this order to produce an electrode group having a positive electrode capacity of 1 Ah. One sheet of separator was laminated on the uppermost second positive electrode, looking from the laminating direction of the electrode group, on which the negative electrode/the separator/the first positive electrode/the separator/the negative electrode were laminated to produce an electrode group in the present invention. The electrode group is shown in FIG. 2 as the conceptual view of one embodiment of the electrode group used in the present invention.

Next, one sheet of the first positive electrode was vibration welded to one piece of the first positive electrode terminal, 13 sheets of the second positive electrodes were vibration welded to one piece of the second positive electrode terminal, and 15 sheets of the negative electrodes were vibration welded to one piece of the negative electrode terminal to produce an electrode group having the terminals.

Figure 3:
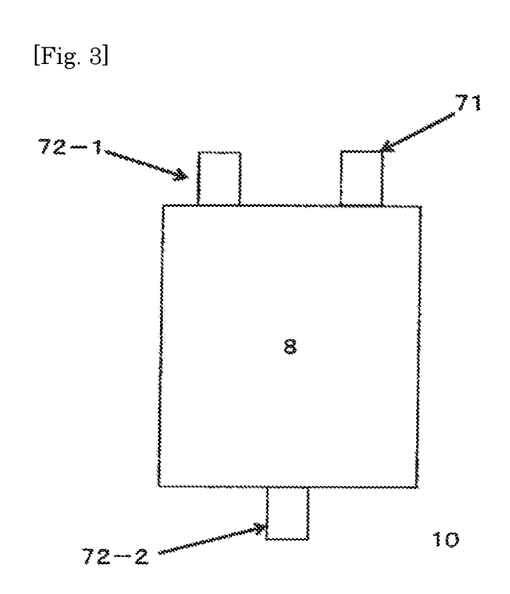
FIG. 3 is an external conceptual view showing another embodiment of the non-aqueous electrolyte secondary battery 10 of the present invention.

Next, the electrode group having the terminals was put in an aluminum laminated sheet bag wherein the part of the terminals extended outside, to which 5.5 mL of non-aqueous electrolyte (an electrolytic solution containing a supporting salt as a non-aqueous solvent: ethylene carbonate:dimethyl carbonate=3:7 (capacity ratio), the supporting salt as a solute: $LiPF_6$=1 mol/L) was further put, and an opening of the bag was sealed while the inside pressure of the bag was reduced, thereby to produce a non-aqueous electrolyte secondary battery having an enclosure in which the electrode group having the terminals, other than the extending parts, was enclosed. The appearance of the non-aqueous electrolyte secondary battery at that time is shown in FIG. 3. Accordingly, FIG. 3 is an external conceptual view showing another embodiment of the non-aqueous electrolyte secondary battery 10 of the present invention. The battery was allowed to stand for 12 hours for aging.

After the battery was aged, the extending parts of the first positive electrode terminal and the negative electrode terminal were connected to two terminals of a charge and discharge device, and charge was performed up to SOC 100% at a constant current of 0.2 C relative to an amount of electricity required for the first positive electrode to reach SOC 100%. After that, the extending part of the first positive electrode terminal was covered with a polyimide tape, whereby the battery was electrically insulated from the periphery.

The thus prepared non-aqueous electrolyte secondary battery of the present invention of Example 1 was subjected to the charge and discharge cycle test described above in which the charge and discharge device was connected to a place between the extending parts of the second positive electrode terminal and the negative electrode terminal and the charge and discharge was repeated. After that, the capacity retention and the amount of gas generated of the battery of Example 1 were measured. The results are shown in Table 1 and Table 2. In the case above, the first positive electrode of the battery of Example 1 was maintained at 100% of the state-of-charge during the charge and discharge cycle test.

The battery of Example 1 was subjected to the charge and discharge cycle by maintaining the state-of-charge of the first positive electrode at 90% (reference result 1), 0% (reference result 2), and 5% (reference result 3), and the test results were shown in Table 2 together with the results of Example 1 (the state-of-charge of the first positive electrode was maintained at 100%) and the results of Example 4 (the first positive electrode was A+, the first positive electrode and the second positive electrode were short-circuited, and the state-of-charge of the first positive electrode was cyclically varied).

TABLE 2

|  | First positive electrode | State-of-charge of first positive electrode (%) | Capacity retention (%) | Amount of gas generated (mL/Ah) |
|---|---|---|---|---|
| Results of Example 1 | A | 100 | 92 | 0.8 |
| Reference result 1 | A | 90 | 93 | 0.3 |
| Results of Example 4 | A+ | Cycle variability | 89 | 0.3 |

TABLE 2-continued

| | First positive electrode | State-of-charge of first positive electrode (%) | Capacity retention (%) | Amount of gas generated (mL/Ah) |
|---|---|---|---|---|
| Reference result 2 | A | 0 | 86 | 4.7 |
| Reference result 3 | A | 5 | 86 | 3.5 |

As shown in the results in Examples 1 to 3, the reference result 1, and the results in Examples 5 to 7, when the first positive electrode was electrically insulated while the state-of-charge was constantly maintained, and the charge and discharge was repeated using the second positive electrode and the negative electrode, it was possible that the first positive electrode was not deteriorated, and the gas generation was inhibited even when the titanium compound was used as the negative electrode active material.

Meanwhile, from Table 2, in particular, from the comparison of the results in Example 4 with the reference results 2 and 3, it was found that, in the battery of the present invention, the first positive electrode had a term during which the electrode was maintained in the state-of-charge during the charge and discharge caused by the working of the battery, which was a normal function of the positive electrode, and thus the gas generation-inhibitory effect, which is the effect of the present invention, remarkably appeared, and increase of the internal resistance, caused by the gas generation, was not occurred, thus resulting in the high capacity retention.

Example 2

A battery of Example 2 was produced in the same manner as in Example 1, except that the positive electrode B was used as the first positive electrode. The produced battery of Example 2 was subjected to the charge and discharge cycle test in the charge condition 1 and the discharge condition 1 while the state-of-charge of the first positive electrode was maintained at 100%. The test results are shown in Table 1.

Example 3

A battery of Example 3 was produced in the same manner as in Example 1, except that the positive electrode C was used as the first positive electrode. The produced battery of Example 3 was subjected to the charge and discharge cycle test in the charge condition 1 and the discharge condition 1 while the state-of-charge of the first positive electrode was maintained at 100%. The test results are shown in Table 1.

Example 4

A battery of Example 4 was produced in the same manner as in Example 1, except that the positive electrode A+ having a capacity of 1.6 mAh/cm² was used as the first positive electrode. The first positive electrode and the second positive electrode in the produced battery of Example 4 were connected to the same positive electrode terminal, and the charge and discharge cycle test was performed in the charge condition 1 and the discharge condition 1, using the positive electrode terminal and the negative electrode terminal. The test results are shown in Tables 1 and 2. In the battery of Example 4, the first positive electrode was not charged up to the pre-determined state-of-charge, but the charge and discharge was repeated while the potential of the first positive electrode was maintained at the same potential level of the second positive electrode during the charge and discharge cycle test.

As shown in Tables 1 and 2, when the first positive electrode and the second positive electrode were connected to the same positive electrode terminal in the battery of Example 4, and both the first positive electrode and the second positive electrode could work during the charge and discharge of the battery, though the gas inhibitory effect could be maintained, the capacity deterioration of the first positive electrode, caused by the charge and discharge, could not be inhibited, and slightly low results was obtained though the capacity retention satisfied the acceptable level.

Example 5

A battery of Example 5 was produced in the same manner as in Example 1, except that the negative electrode G was used as the negative electrode. The produced battery of Example 5 was subjected to the charge and discharge cycle test in the charge condition 1 and the discharge condition 1 while the state-of-charge of the first positive electrode was maintained at 90%. The test results are shown in Table 1.

Example 6

A battery of Example 6 was produced in the same manner as in Example 1, except that the negative electrode H was used as the negative electrode. The produced battery of Example 6 was subjected to the charge and discharge cycle test in the charge condition 1 and the discharge condition 1 while the state-of-charge of the first positive electrode was maintained at 90%. The test results are shown in Table 1.

Example 7

A battery was produced in the same manner as in Example 1, except that the high voltage positive electrode E was used as the second positive electrode. The produced battery of Example 7 was subjected to the charge and discharge cycle test in the same method described above (method of charge and discharge cycle test), except that the state-of-charge of the first positive electrode was maintained at 90%, the charge and discharge cycle test was performed at an environmental temperature of 25° C. instead of 60° C., and the following charge condition 2 was used instead of the charge condition 1 as the charge and discharge condition. The test results are shown in Table 1.

Charge condition 2: Charge was performed at a constant current of 1.0 C until a voltage reached 3.4 V relative to the total capacity of the second positive electrode, and then the charge was finished when the voltage was reached 3.4 V.

Comparative Example 1

A battery of Comparative Example 1 was produced in the same manner as in Example 1, except that the positive electrode D was used as the first positive electrode. The produced battery of Comparative Example 1 was subjected to the charge and discharge cycle test in the charge condition 1 and the discharge condition 1 while the state-of-charge of the first positive electrode was maintained at 100%. The test results are shown in Table 1.

Comparative Example 2

A battery was produced and evaluated in the same manner as in Example 7, except that the positive electrode E was used as the first positive electrode.

REFERENCE SIGNS LIST

1 Negative electrode
2 Positive electrode
3 Separator
7 Terminal
8 Enclosure
9 Terminal-extending part
10 Non-aqueous electrolyte secondary battery
21 First positive electrode
22 Second positive electrode
31 Negative electrode held by separators
71 Negative electrode terminal
72 Positive electrode terminal
72-1 First positive electrode terminal
72-2 Second positive electrode terminal
100 Battery pack

The invention claimed is:

1. A non-aqueous electrolyte secondary battery, comprising:
one enclosure that has a space thereinside;
a non-aqueous electrolyte that fills the enclosure;
two positive electrodes (21, 22) each of which contains one or more positive electrode active materials,
one of the positive electrodes being a first positive electrode (21) composed with a first positive component that is selected from the positive electrode active materials, and
the other of the positive electrodes being a second positive electrode (22) composed with a second positive component that is selected from the positive electrode active materials wherein the second positive component is provided in 50% or more by mass relative to all the positive electrode active materials in the second positive electrode;
a negative electrode (1) that contains one or more negative electrode active materials wherein a titanium compound, which is as a main negative component, is provided in 50% or more by mass relative to all the negative electrode active materials;
two separators (3) that are formed from an electrical insulating material; and
terminals that are connected individually to the first positive electrode, the second positive electrode and the negative electrode, each of the terminals being connected to a terminal-extending part (9) wherein the terminals connected to the first positive electrode, the second positive electrode and the negative electrode are respectively defined as a first terminal (72-1), a second terminal (72-2) and a negative electrode (71), which are physically separated and electrically isolated from each other, wherein
the enclosure accommodates the first positive electrode, the second positive electrode, the negative electrode, two separators and the non-aqueous electrolyte in the space,
the terminal-extending parts, which are connected to the first terminal, the second terminal and the negative terminal, extend outward from the enclosure,
the two separators are disposed in parallel, and the negative electrode intervenes between the two separators, the two separators and the negative electrode forming a separator-holding negative electrode unit,
the first positive electrode, the separator-holding negative electrode unit and the second positive electrode are laminated in this order inside the enclosure,
the first positive component of the first positive electrode is a layered rock salt compound,
the second positive component of the second positive electrode is a spinel type lithium manganate, and
a number of the terminal-extending parts connected to the first and second terminal (72-1 and 72-2) is larger than a number of the terminal-extending part connected to the negative terminal (71).

2. The non-aqueous electrolyte secondary battery according to claim 1, further comprising:
two additional separator-holding negative electrode units that are configured in the same manner as the separator-holding negative electrode unit, wherein
all sides of the first and second positive electrodes are directly contacted with the separator-holding negative electrode units.

3. The non-aqueous electrolyte secondary battery according to claim 1, wherein
the first positive electrode is not discharged by connection to at least an external load except for self-discharge during the discharge of the non-aqueous electrolyte secondary battery, and is maintained in the enclosure while the state-of-charge is kept at a certain level.

4. The non-aqueous electrolyte secondary battery according to claim 1, wherein
the titanium compound is one or more compounds selected from the group consisting of titanium compounds shown by $Li_4Ti_5O_{12}$, $H_2Ti_{12}O_{25}$, and $TiO_2$.

5. The non-aqueous electrolyte secondary battery according to claim 1, wherein
the layered rock salt compound of the first positive component is one or more layered rock salt compounds selected from the group consisting of lithium cobaltate, lithium cobalt-nickel-aluminate, and lithium cobalt-nickel-manganate.

6. A battery pack, comprising
a plurality of the non-aqueous electrolyte secondary batteries according to claim 1 connected to each other.

7. The non-aqueous electrolyte secondary battery according to claim 1, wherein
all the positive electrode active materials of the first positive electrode are provided in a range from 1% to 10% by mass relative to all the positive electrode active materials of the second positive electrode.

8. The non-aqueous electrolyte secondary battery according to claim 7, further comprising:
one or more positive electrodes that are additional second positive electrodes composed with an additional positive component that is selected from the positive electrode active materials wherein the additional second positive component is provided in 50% or more by mass relative to all the positive electrode active materials in the additional second positive electrode;
one or more negative electrodes that are additional negative electrodes containing one or more negative electrode active materials wherein the titanium compound, which is as a main negative component, is provided in 50% or more by mass relative to all the negative electrode active materials;
one or more separators that are additional separators formed from the electrical insulating material, wherein the additional second positive electrodes, the additional negative electrodes and the separators are alternatively laminated from the second positive electrode in a laminating direction such that each of the additional negative electrodes and the additional second positive electrodes is sandwiched between a pair of the additional separators, and the first positive electrode is positioned outside a negative electrode region in the laminating direction wherein the negative electrode region is determined from the separator-holding negative electrode unit to any of the additional second positive electrodes, which is positioned farthest from the first positive electrode, in the laminating direction.

9. The non-aqueous electrolyte secondary battery according to claim 8, wherein a number of the first positive electrode accommodated in the enclosure is one, a total number that counts the second positive electrode and the additional second positive electrodes, which are accommodated in the enclosure, is two or more.

10. The non-aqueous electrolyte secondary battery according to claim 9, wherein the additional second positive electrodes are connected to the second terminal.

11. The non-aqueous electrolyte secondary battery according to claim 8, further comprising:

one or more positive electrodes that are additional first positive electrodes composed with an additional positive component that is a layered rock salt compound, the additional first positive electrodes being accommodated in the enclosure, and the additional first positive electrodes are connected to the first terminal.

12. The non-aqueous electrolyte secondary battery according to claim 8, further comprising:

one or more positive electrodes that are additional first positive electrodes composed with an additional positive component that is a layered rock salt compound, the additional first positive electrodes being accommodated in the enclosure, one or more additional first terminals that are connected to the additional first positive electrodes, each of the additional first terminals having a terminal-extending part, which extends outwards from the enclosure, one or more additional second terminals that are connected to the additional second positive electrodes, each of the additional second terminals having a terminal-extending part, which extends outwards from the enclosure, one or more additional negative terminals that are connected to the additional negative electrodes, each of the additional negative terminals having a terminal-extending part, which extends outwards from the enclosure, wherein a total number that counts the first terminal, the additional first terminal, the second terminal and the additional second terminal is larger than a total number that counts the negative terminal and the additional negative terminal.

13. The non-aqueous electrolyte secondary battery according to claim 1, wherein the first positive component is provided in 50% or more by mass relative to all the positive electrode active materials in the first positive electrode.

* * * * *